US012812407B2

(12) United States Patent
Somashekar et al.

(10) Patent No.: US 12,812,407 B2
(45) Date of Patent: Nov. 24, 2026

(54) AEROSPACE SYSTEM AND DEVICE FOR MITIGATING INTERFERENCE THROUGH DYNAMIC PHYSICAL RESOURCE BLOCK BLANKING TECHNIQUES

(71) Applicant: T-MOBILE INNOVATIONS LLC, Overland Park, KS (US)

(72) Inventors: Sharath Somashekar, Overland Park, KS (US); Mason Tyler Bouffard, Seattle, WA (US); Rashmi Kumar, Herndon, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 626 days.

(21) Appl. No.: 18/203,894

(22) Filed: May 31, 2023

(65) Prior Publication Data

US 2024/0406754 A1 Dec. 5, 2024

(51) Int. Cl.
*H04W 24/02* (2009.01)
*H04B 7/185* (2006.01)

(52) U.S. Cl.
CPC ........ *H04W 24/02* (2013.01); *H04B 7/18519* (2013.01)

(58) Field of Classification Search
CPC ............... H04W 24/02; H04B 7/18519; H04B 7/18513
See application file for complete search history.

(56) References Cited

U.S. PATENT DOCUMENTS 5,485,167 A * 1/1996 Wong ....................... H01Q 5/42 343/834
6,975,837 B1 * 12/2005 Santoru ................ H04B 7/1851 455/12.1

(Continued)

FOREIGN PATENT DOCUMENTS

CA 2428702 C * 7/2007 ........... H04B 7/2041

OTHER PUBLICATIONS

Imc blog, "Types of satellite networks making IoT solutions a reality", Web Page "https://www.iotm2mcouncil.org/iot-1 library/articles/smart-industries/types-of-satellite-networks-making-iot-solutions-a-reality/" 5 Pages, Publication Date, May 17, 2022. (Year: 2022).*

(Continued)

*Primary Examiner* — Yuwen Pan
*Assistant Examiner* — Swati Jain
(74) *Attorney, Agent, or Firm* — Shook, Hardy & Bacon L.L.P.

(57) ABSTRACT

Aspects herein provide systems, methods, and media for mitigating uplink degradation, noise, and/or other interference experienced between a user device and a satellite by blanking of physical resource blocks that are being used on the same or an overlapping radio frequency spectrum by user devices communicating with terrestrial base stations via a telecommunications network. When the uplink degradation, noise, and/or other interference is below a signal quality threshold, the telecommunications network identifies base stations with coverage areas that overlap with the coverage area of the satellite. The telecommunications network instructs and causes those base stations to blank physical resource blocks on the uplink channel(s) that correspond to the portions of the radio frequency spectrum at issue. This blanking technique reduces or prevents uplink degradation, noise, and/or other interference experienced between a user device and a satellite and caused by communications between other user devices and the terrestrial base stations.

20 Claims, 6 Drawing Sheets

(56) References Cited

U.S. PATENT DOCUMENTS

| | | | | |
|---|---|---|---|---|
| 11,240,824 | B2 | 2/2022 | Amer | |
| 11,677,446 | B2 * | 6/2023 | Singh | H01Q 3/2611 375/262 |
| 2003/0073436 | A1 * | 4/2003 | Karabinis | H04B 7/18563 455/427 |
| 2004/0229616 | A1 * | 11/2004 | Dutta | H04W 36/302 455/436 |
| 2006/0105798 | A1 * | 5/2006 | Ghosh | H04W 52/12 455/69 |
| 2007/0155319 | A1 | 7/2007 | Monte et al. | |
| 2010/0039967 | A1 * | 2/2010 | Karabinis | H04B 7/216 370/294 |
| 2012/0213092 | A1 * | 8/2012 | Sun | H04W 52/244 370/252 |
| 2013/0281010 | A1 * | 10/2013 | Monte | H04B 7/18563 455/13.4 |
| 2015/0271730 | A1 * | 9/2015 | Benammar | H04B 7/18517 455/436 |
| 2016/0302209 | A1 * | 10/2016 | Behravan | H04W 72/541 |
| 2017/0086147 | A1 * | 3/2017 | Zhang | H04W 52/245 |
| 2017/0366251 | A1 * | 12/2017 | Ravishankar | H04B 7/18513 |
| 2018/0103381 | A1 * | 4/2018 | Ramamurthi | H04W 36/0016 |
| 2019/0082396 | A1 * | 3/2019 | Maheshwari | H04W 52/285 |
| 2019/0239082 | A1 * | 8/2019 | Ravishankar | H04B 7/18528 |
| 2020/0396003 | A1 * | 12/2020 | Moro | H04B 7/2041 |
| 2021/0105844 | A1 * | 4/2021 | Joseph | H04W 80/08 |
| 2021/0167820 | A1 | 6/2021 | Singh | |

| | | | | |
|---|---|---|---|---|
| 2021/0242935 | A1 * | 8/2021 | Sakhnini | H04B 7/18543 |
| 2021/0329654 | A1 * | 10/2021 | Amer | H04B 17/345 |
| 2022/0007200 | A1 * | 1/2022 | Sevindik | H04W 52/143 |
| 2022/0046504 | A1 | 2/2022 | Shrestha et al. | |
| 2022/0052753 | A1 * | 2/2022 | Speidel | H04B 7/18513 |
| 2022/0295381 | A1 * | 9/2022 | Höglund | H04J 3/0661 |
| 2022/0312301 | A1 * | 9/2022 | Christopherson | H04W 48/16 |
| 2022/0368411 | A1 * | 11/2022 | Speidel | H04B 7/18513 |
| 2023/0059780 | A1 | 2/2023 | Ravishankar et al. | |
| 2023/0121634 | A1 | 4/2023 | Shrestha et al. | |
| 2023/0224839 | A1 * | 7/2023 | Park | H04W 56/0005 370/350 |
| 2023/0403744 | A1 | 12/2023 | Deepak | |
| 2024/0056239 | A1 * | 2/2024 | Zufall | H04W 72/1268 |
| 2024/0204863 | A1 * | 6/2024 | Sohi | H04B 7/18563 |
| 2024/0381107 | A1 | 11/2024 | Mansour et al. | |
| 2024/0405850 | A1 | 12/2024 | Somashekar et al. | |
| 2024/0413893 | A1 | 12/2024 | Mukae | |
| 2025/0080205 | A1 | 3/2025 | Mansour et al. | |
| 2025/0219717 | A1 * | 7/2025 | Anchala | H04B 7/18513 |
| 2025/0374186 | A1 * | 12/2025 | Oliveira | H04W 52/0206 |

OTHER PUBLICATIONS

Non-Final Office Action received for U.S. Appl. No. 18/203,899, mailed on Nov. 7, 2025, 11 pages.

Final Office Action received for U.S. Appl. No. 18/203,899, mailed on May 12, 2026, 12 pages.

* cited by examiner

AEROSPACE SYSTEM AND DEVICE FOR MITIGATING INTERFERENCE THROUGH DYNAMIC PHYSICAL RESOURCE BLOCK BLANKING TECHNIQUES

TECHNICAL BACKGROUND

The present disclosure generally relates to reusing portions of a radio frequency spectrum.

SUMMARY

A high-level overview of various aspects of the invention are provided here to offer an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter.

When a user device utilizes a portion of a radio frequency spectrum to communicate with an aerospace access point such as a deployed and orbiting satellite, noise and/or other interference may impact the communications between the user device and the aerospace access point. The noise and/or other interference experienced between the user device and the aerospace access point may be a result of one or more nearby user devices that are communicating with one or more terrestrial access points using the same or similar portion (e.g., at least partially overlapping, and/or adjacent) of the radio frequency spectrum being used by the user device and the aerospace access point. To mitigate, prevent, or reduce the noise and/or other interference between the user device and the aerospace access point, embodiments herein provide a technological solution for controlling the use and non-use (e.g., not scheduling data in one or more of the physical resource blocks; "blanking") of physical resource blocks when scheduling communications between the one or more nearby user devices and the one or more terrestrial access points.

In one aspect, a computerized method is provided. In accordance with the method, uplink quality is determined for a user device that communicates directly with an apparatus when that apparatus is in orbit, based on one or more communications sent by the user device over an uplink channel. When the uplink quality for the uplink channel is determined to be below a threshold, a degradation indicator is generated that includes a unique apparatus identifier and an indication that uplink quality is less than the threshold. The degradation indicator of the uplink quality is communicated to a terrestrial wireless network.

In another aspect, a device is provided. The devices includes an antenna, a transponder, a power supply, a housing, and one or more processors. The one or more processors are configured to determine the uplink quality between a user device that communicates directly with the apparatus using an uplink channel when the apparatus is in orbit. When the uplink quality is determined to be below a threshold, the one or more processors generate a degradation indicator that includes a unique apparatus identifier and that indicates that the uplink quality of the uplink channel is below a threshold. The apparatus then communicates the degradation indicator to a terrestrial wireless network.

In yet another aspect, a system is provided. The system comprises an antenna, a transponder, a power supply system, an orientation and stabilization system, a housing, and one or more processors. The one or more processors of the system determine uplink quality between a user device and the apparatus. When the uplink quality is determined to be below threshold, the processors generate a degradation indicator that include a unique apparatus identifier and indication that uplink quality is less than a threshold. The degradation indicator for an uplink channel is communicated to a terrestrial wireless network. The system can subsequently determine the uplink quality between the user device and the apparatus, for example, periodically or intermittently.

BRIEF DESCRIPTION OF THE DRAWINGS

Aspects are described in detail below with reference to the attached drawings figures, wherein.

DETAILED DESCRIPTION

Figure 1:
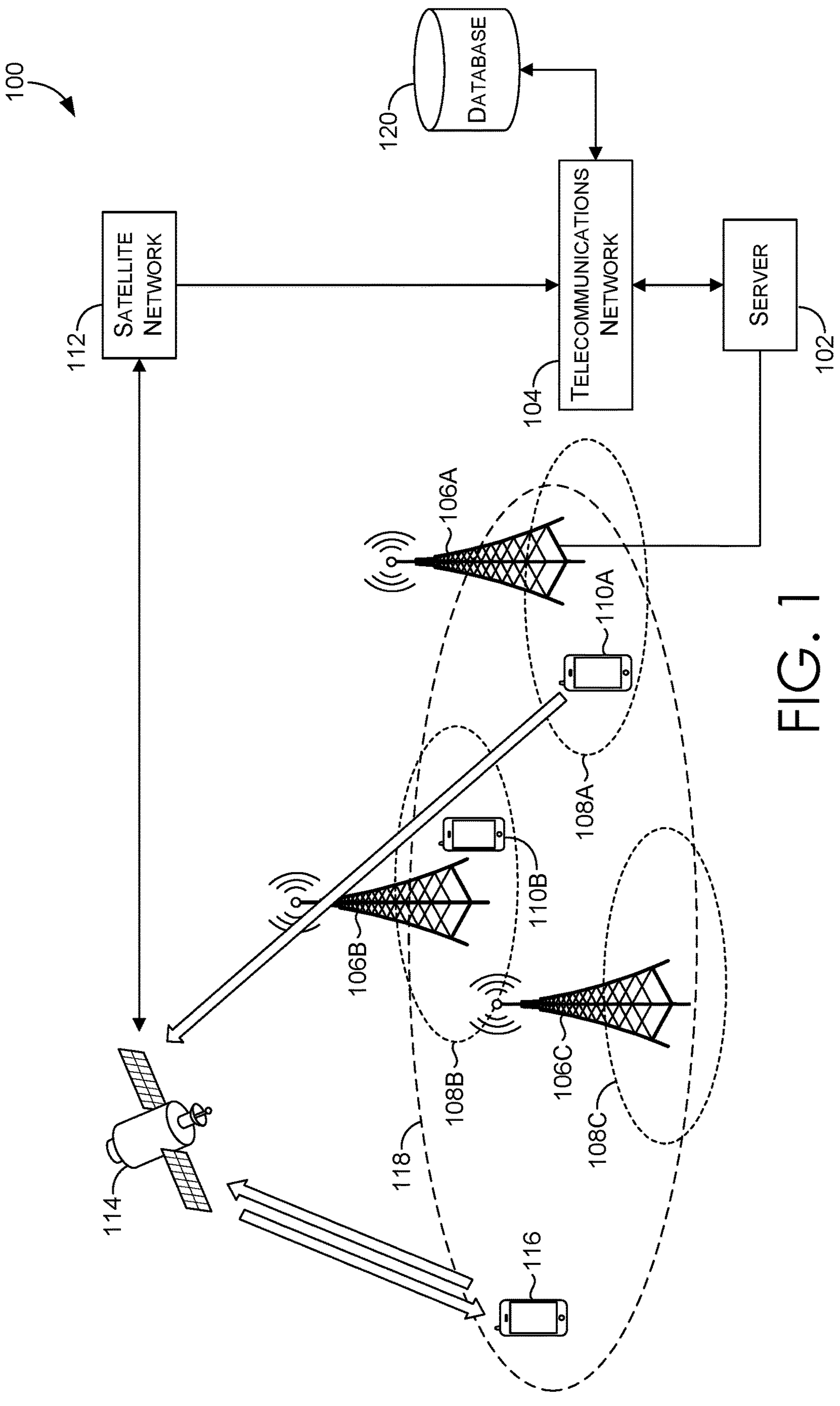
FIG. 1 depicts an example of a system, in accordance with one or more embodiments.

The subject matter of the present invention is being described with specificity herein to meet statutory requirements. However, the description itself is not intended to limit the scope of this patent. Rather, the inventors have contemplated that the claimed subject matter might also be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described. As such, although the terms "step" and/or "block" may be used herein to connote different elements of systems and/or methods, the terms should not be interpreted as implying any particular order and/or dependencies among or between various components and/or steps herein disclosed unless and except when the order of individual steps is explicitly described. The present disclosure will now be described more fully herein with reference to the accompanying drawings, which may not be drawn to scale and which are not to be construed as limiting. Indeed, the present invention can be embodied in many different forms and should not be construed as limited to the embodiments and aspects set forth herein.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

3G Third-Generation Wireless Access Technology
4G Fourth-Generation Wireless Access Technology
5G/5G NR Fifth-Generation Wireless Access Technology/New Radio 5GC Fifth-Generation Wireless Access Technology Core Network
AAU Active Antenna Unit
BRS Broadband Radio Service
CD-ROM Compact Disk Read Only Memory
CDMA Code Division Multiple Access
CU Central Unit
DU Distribution Unit
EIRP Equivalent Isotropically Radiated Power
eNodeB Evolved Node B
EVDO Evolution-Data Optimized
GIS Geographic/Geographical/Geospatial Information System
gNodeB/gNB Next Generation Node B
gNB CU Next Generation Node B Central Unit
gNB DU Next Generation Node B Distribution Unit
GPRS General Packet Radio Service
GSM Global System for Mobile Communication
iDEN Integrated Digital Enhanced Network
DVD Digital Versatile Disc
EEPROM Electrically Erasable Programmable Read-Only Memory
FD-MIMO Full Dimension Multiple-Input Multiple-Output
IoT Internet of Things
IIOT Industry Internet of Things
LED Light Emitting Diode
LTE Long Term Evolution
MEC Mobile Far Edge Computer
MD Mobile Device
MIMO Multiple-Input Multiple-Output
mMIMO Massive Multiple-Input Multiple-Output
MMU Massive Multiple-Input Multiple-Output Unit
mmWave Millimeter Wave
NEXRAD Next-Generation Radar
NR New Radio
OOBE Out-of-Band-Emission
OTN Optical Transport Network
PC Personal Computer
PCS Personal Communications Service
PDA Personal Digital Assistant
PLMN Public Land Mobile Network
PRB Physical Resource Block
vPRB Virtualized Physical Resource Block
RAN Radio Access Network
RAM Random Access Memory
RET Remote Electrical Tilt
RF Radio-Frequency
RFI Radio-Frequency Interference
RIC Radio Intelligent Controller
RLF Radio Link Failure
R/N Relay Node
RNR Reverse Noise Rise
ROM Read-Only Memory
RRU Remote Radio Unit
RSRP Reference Signal Receive Power
RSRQ Reference Signal Receive Quality
RSSI Received Signal Strength Indicator
RU Radio Unit
SINR Signal-to-Interference-&-Noise Ratio
SNR Signal-to-Noise Ratio
SON Self-Organizing Networks
TDMA Time Division Multiple Access
TXRU Transceiver (or Transceiver Unit)
UE User Equipment
UMTS Universal Mobile Telecommunications System
UTRAN UMTS Radio Access Network
E-UTRAN Evolved Universal Mobile Telecommunications System
WCD Wireless Communication Device (interchangeable with UE)
WLAN Wireless Local Area Network
XR Extended Reality Further, various technical terms are used throughout this description. An illustrative resource that fleshes out various aspects of these terms can be found in Newton's Telecom Dictionary, 25th Edition (2009).

Aspects herein may be embodied as, among other things: a method, system, or set of instructions embodied on one or more computer-readable media. Aspects may take the form of a hardware embodiment or an embodiment combining software and hardware. Some aspects may take the form of a computer program product that includes computer-useable or computer-executable instructions embodied on one or more computer-readable media.

Definitions

"Computer-readable media" can be any available media and may include volatile and non-volatile media, as well as removable and non-removable media. By way of example, and not limitation, computer-readable media may include computer storage media and communication media. Computer-readable media may include both volatile and non-volatile media, removable and non-removable media, and may include media readable by a database, a switch, and various other network devices. Computer-readable media includes media implemented in any way for storing information. Examples of stored information include computer-useable instructions, data structures, program modules, and other data representations.

"Computer storage media" may include, without limitation, volatile and non-volatile media, as well as removable and non-removable media, implemented in any method or technology for the storage of information, such as computer-readable instructions, data structures, program modules, or other data. In this regard, computer storage media may include, but is not limited to, RAM, ROM, Electrically Erasable Programmable Read-Only Memory (EEPROM), flash memory or other memory technology, CD-ROM, DVD, holographic media, other optical disk storage, magnetic cassettes, magnetic tape, magnetic disk storage or other magnetic storage device, or any other medium that can be used to store the desired information and which may be accessed by the computing device 400 shown in FIG. 6. These technologies can store data momentarily, temporarily, or permanently.

"Communication media" may include, without limitation, computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner so as to encode information in the signal. By way of example, and not limitation, communication media includes wired media such as a wired network or direct-wired connection and wireless media such as acoustic, radio frequency (RF), infrared, and other wireless media. Combinations of any of the above may also be included within the scope of computer-readable media.

"Aerospace" is used herein to refer generally to the Earth's atmosphere and the outer space within the proximate vicinity of the Earth's atmosphere. In the context of an access point, the term "aerospace" is used to refer to a physical location of such an access point that is located within and/or orbiting within the Earth's atmosphere (e.g., in the thermosphere or exosphere) and/or the outer space within the proximate vicinity of the Earth's atmosphere, such that said physical location is not at or upon the Earth's surface.

"Network" refers to a network comprised of wireless and wired components that provide wireless communications service coverage, for example, to one or more user devices. For example, the network may include one or more, or a plurality of, wireless networks, hardwired networks, telecommunication networks, peer-to-peer networks, distributed networks, and/or any combination thereof. The network may comprise one or more access points, one or more cell sites (i.e., managed by an access point), one or more structures such as cell towers (i.e., having an antenna) associated with each access point and/or cell site, a gateway, a backhaul data center, a server that connects two or more access points, a database, a power supply, sensors, and other components not discussed herein, in various aspects. Examples of a network include a telecommunications network (e.g., 3G, 4G, 5G, CDMA, CDMA 1×A, GPRS, EVDO, TDMA, GSM, LTE, and/or LTE Advanced) and/or a satellite network (e.g., Low Earth Orbit [LEO], Medium Earth Orbit [MEO], or geostationary). Additional examples of a network include a wide area network (WAN), a local area network (LAN), a metropolitan area network (MAN), a wide area local network (WLAN), a personal area network (PAN), a campus-wide network (CAN), a storage area network (SAN), a virtual private network (VPN), an enterprise private network (EPN), a home area network (HAN), a Wi-Fi network, a Worldwide Interoperability for Microwave Access (WiMAX) network, and/or an ad-hoc (mesh) network. The network may include or may communicate with a physical location component for determining a geographic location of an item, package, parcel, personnel, vehicle, end-point location, etc., by leveraging, for example, a Global Positioning System (GPS), Global'naya Navigatsionnaya Sputnikovaya Sistema (GLONASS), BeiDou Navigation Satellite System (BDS), Global Navigation Satellite System (GNSS or "Galileo"), an indoor position system (IPS), or other positioning systems that leverage non-GPS signals or networks (e.g., signals of opportunity [SOP]).

"Physical resource block" (PRB) is used to refer to a defined quantity of consecutive subcarriers in a frequency domain that is used for wireless transmission and wireless reception of waveform signals via antennas/antenna elements. In some instances, a physical resource block has a defined quantity of consecutive subcarriers in a frequency domain within one slot in a time domain (e.g., LTE). In other instances, a physical resource block has a defined quantity of consecutive subcarriers in a frequency domain independent of the time domain (e.g., 5G NR). In one example, one resource block has twelve consecutive subcarriers of a frequency domain, where one subcarrier corresponds to one resource element in the resource block. The bandwidth of various physical resource blocks is dependent on the numerology and subcarrier spacing utilized, which corresponds to the frequency bands as defined in kilohertz (kHz) and which determines the cyclic prefix of said block in milliseconds (ms). For example, 5G NR technology supports subcarrier spacing of 15, 30, 60, 120, and 240 kHz while LTE technology supports only one subcarrier spacing of 15 kHz. The physical resource blocks form bandwidth parts (BWP). The physical resource blocks discussed herein are compatible and usable in LTE, LTE-M, 3G, 4G, 5G, IoT, IIOT, NB-IoT, and similar technologies without limitation. For this reason, physical resource blocks are discussed herein in a network-agnostic manner, as the aspects discussed herein can be implemented within each of the different technology environments.

"Access point" and "base station" are used interchangeably herein to reference hardware, software, devices, or other components for a communications device or structure having an antenna, an antenna array, a radio, a transceiver, and/or a controller. An access point can be deployed terrestrially at or near the Earth's surface, or within the atmosphere, for example, to orbit the Earth. For example, an "aerospace access point" may be a satellite deployed to orbit the Earth within or above the atmosphere (e.g., in the thermosphere or exosphere), whereas a "terrestrial access point" may be a fixed or semi-fixed base station located on the Earth's surface or upon any structure located on the surface. As discussed herein, an access point is a device comprised of hardware and complex software that is deployed in a network so that the access point can control and facilitate, via one or more antennas or antenna arrays, the broadcast, transmission, synchronization, and receipt of wireless signals in order to communicate with, verify, authenticate, and provide wireless communications service coverage to one or more user devices that request to join and/or are connected to the network. Generally, an access point can communicate directly with one or more user devices according to one or more access technologies (e.g., 3G, 4G, LTE, 5G, and mMIMO). An example of an aerospace access point includes a satellite. Examples of a terrestrial access point include a base station, eNodeB, a gNodeB, a macro cell, a small cell, a micro cell, a femto-cell, a pico-cell, and/or a computing device capable of acting as a wireless "hotspot" that enables connectivity to the network. Accordingly, the scale and coverage area of various types of access points are not limited to the examples discussed. Access points may work alone or in concert with one another, locally or remotely.

"Cell site" is generally used herein to refer to a defined wireless communications coverage area (i.e., a geographic area) serviced by an access point or a plurality of neighboring access points working together to provide a single coverage area. Also, it will be understood that one access point may control one cell site/coverage area, or, alternatively, one access point may control multiple cell sites/coverage areas.

"User equipment" (UE), "user device," "mobile device," and "wireless communication device" are used interchangeably to refer to a device having hardware and software that is employed by a user in order to send and/or receive electronic signals/communication over one or more networks, whether terrestrial or aerospace. User devices generally include one or more antennas coupled to a radio for exchanging (e.g., transmitting and receiving) transmissions with an in-range base station that also has an antenna or antenna array. In aspects, user devices may constitute any variety of devices, such as a personal computer, a laptop computer, a tablet, a netbook, a mobile phone, a smartphone, a personal digital assistant, a wearable device, a fitness tracker, or any other device capable of communicating using one or more resources of the network. User devices may include components such as software and hardware, a processor, a memory, a display component, a power supply or power source, a speaker, a touch-input component, a keyboard, and the like. In various examples or scenarios that may be discussed herein, user devices may be capable of using 5G technologies with or without backward compatibility to prior access technologies, although the term is not limited so as to exclude legacy devices that are unable to utilize 5G technologies, for example.

The terms “radio,” “controller,” “antenna,” and “antenna array” are used interchangeably herein to refer to one or more software and hardware components that facilitate sending and receiving wireless radio frequency signals, for example, based on instructions from a base station. A radio may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas having a length, for example, of ¼, ½, 1, or 1½ wavelengths. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

Additionally, it will be understood that sequential or relative terms such as “first,” “second,” and “third” are used herein for the purposes of clarity in distinguishing between elements or features, but the terms are not used herein to import, imply, or otherwise limit the relevance, importance, quantity, technological functions, physical or temporal sequence, physical or temporal order, and/or operations of any element or feature unless specifically and explicitly stated as such.

Overview

As mentioned above, noise and/or other interference may impact the communications between a user device and an aerospace access point when that user device utilizes the same portion of a radio frequency spectrum that one or more nearby user devices are also using to communicate with one or more terrestrial access points. To mitigate, prevent, and/or reduce the noise and/or other interference experienced between the user device and the aerospace access point, components operating within the terrestrial network control the use and non-use (e.g., determining and implementing “blanking” of physical resource blocks) of physical resource blocks when scheduling communications between the one or more nearby user devices and the one or more terrestrial access points. As discussed hereinafter, the one or more physical resource blocks that are selected can be specifically identified as corresponding to at least a portion of the radio spectrum that is being reused between various user devices, and the quantity of those physical resource blocks to blank can be specifically determined.

FIG. 1 depicts an example of a network environment 100, in accordance with one or more embodiments. The network environment 100 includes a server 102 having one or more processors. The server 102 operates within and thus is communicatively coupled to a telecommunications network 104 or its components. The server 102 is communicatively coupled to one or more base stations 106A, 106B, and 106C within the telecommunications network 104. Each of the one or more base stations 106A, 106B, and 106C has a corresponding coverage area 108A, 108B, and 108C. The one or more base stations 106A, 106B, and 106C can provide telecommunications services to one or more user devices 110A and 110B.

In the network environment 100 shown, the telecommunications network 104 interfaces with satellite network 112, which is also referred to as an aerospace network. In one aspect, the server 102 operates as, or is communicatively coupled to, a telecommunications core network component that acts as an interface between the satellite network 112 and the telecommunications network 104. The satellite network 112 can include one or more devices configured to act as aerospace access points, such as satellite 114. Although not shown, the satellite network 112 may interface with and communicate with one or more terrestrial radio elements that are not associated with the telecommunications network 104. The satellite 114 can provide connectivity to a user device 116 that is located within the coverage area 118 of the satellite 114.

In aspects, the user device 110A that is located within coverage area 108A communicates with the base station 106A, such that the base station 106A provides the user device 110A with connectivity to and services of the telecommunications network 104. The user device 110A may communicate with the base station 106A using Frequency Division Duplexing (FDD), in some aspects. In one such aspect, the user device 110A sends communications to the base station 106A over an uplink channel, using one or more particular radio frequencies designated for the uplink channel in accordance with FDD techniques. Meanwhile, the user device 116 that is located within the coverage area 118 may send communications to the satellite 114 over an uplink channel. These communications of the user device 116 may be transmitted using the same particular radio frequencies designated for the uplink channel, and which are being used by the user device 110A to communicate with the base station 106A. Due to the proximity and/or at least a partial overlap of the coverage area 118 of the satellite 114 with the coverage area 110A of the base station 106A, the use of the same radio frequencies by the user device 116 and the user device 110A can result in noise and/or other interference on the uplink channel. For example, the satellite 114 may detect, measure, and/or determine that noise and/or interference is occurring, based on one or more communications between the user device 110A and the satellite 114 over the uplink channel being impacted by other uplink communications. The amount or level of noise and/or interference may be detected, measured, and/or determined by the user device 116 and reported to the satellite 114, in some instances.

Figure 2:
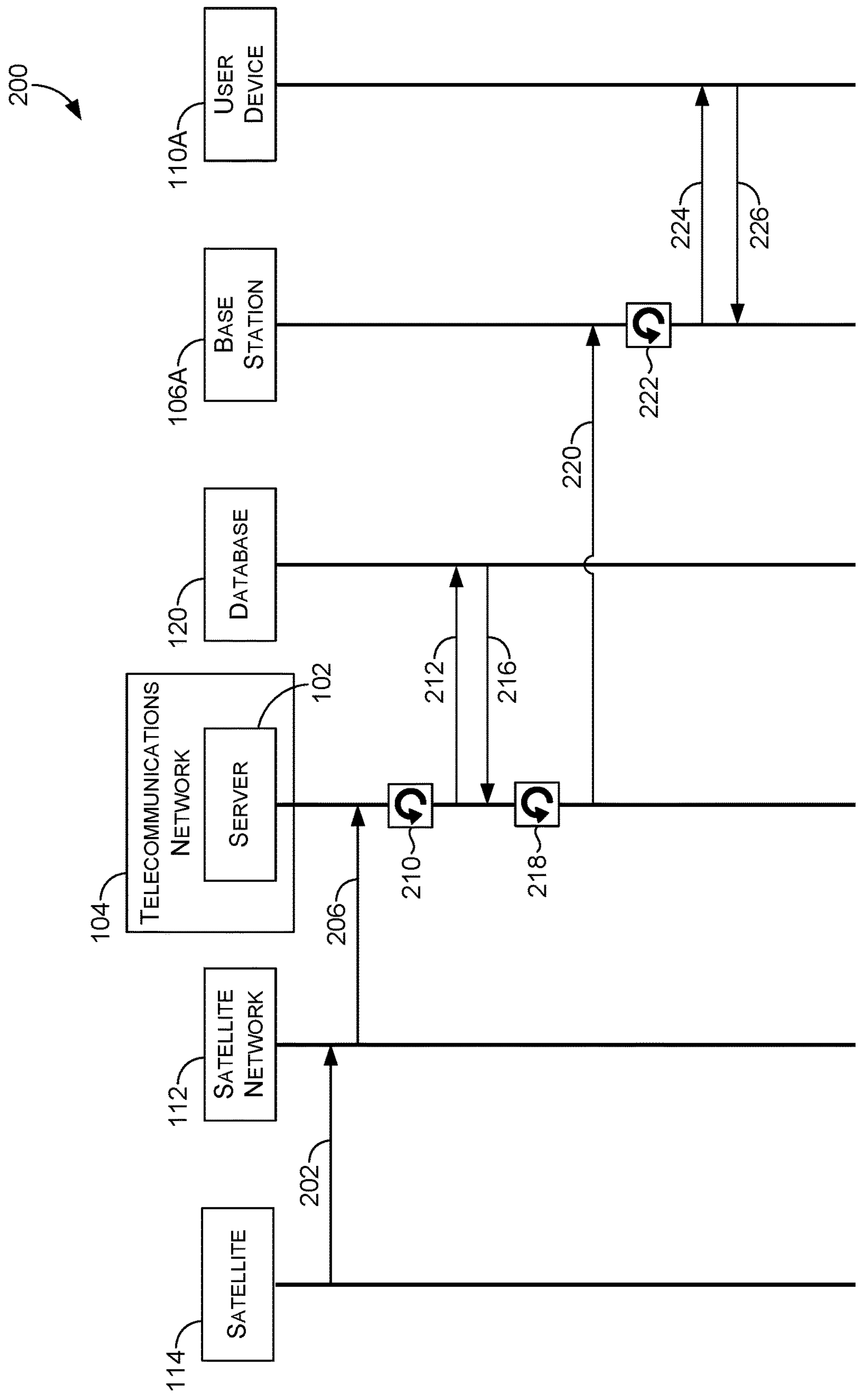
FIG. 2 depicts a diagram of communications associated with the method of FIG. 3 and involving components system of FIG. 1, in accordance with one or more embodiments.

As shown in the diagram 200 of FIG. 2, based on the noise and/or other interference (referred to hereinafter as “noise” for brevity) that is detected, measured, determined, and/or identified by the satellite 114 in communication with a user device, such as the user device 116, a degradation indicator can be generated and communicated 202 by the satellite 114 via the satellite network 112. The degradation indicator can further be communicated 206 through the satellite network 112 to the telecommunications network 104, where the server 102 is located. In various aspects, the degradation indicator can include or specify a unique identifier that particularly identifies and distinguishes the satellite 114 from other satellites and/or terrestrial access points. As such, the server 102 can receive the degradation indicator, which may be specific to an uplink channel between the user device 116 and the satellite 114. The degradation indicator can identify the satellite 114 and/or specify specifications and configurations of the satellite 114, in aspects. The degradation indicator can, in various aspects, identify the satellite network 112 and/or specify specifications and configurations of the satellite network 112. In some aspects, the degradation indicator can identify and/or specify a unique identifier that particularly identifies and distinguishes the user device 116 from other user devices, such as user devices 110A, 110B, and 110C. The degradation indicator can specify specifications and configurations of the user device 116, in aspects. Additionally, in some aspects, the degradation indicator can specify a value (e.g., numerical) for the noise and/or other interference, such as a measurement that captures or quantifies the noise measured by the user device and/or the satellite, in various aspects. For example, any value in the range of −10 and +40 decibels (dB) could be utilized and included in the degradation indicator to quantify or represent the signal quality of the uplink channel, for which noise is detected. Additionally or alternatively, the degradation indicator can indicate and/or specify that the noise measurement is determined to be less than, meet, or exceed a particular threshold or threshold value for noise.

In response to receipt of the degradation indicator and/or information encoded therein, the server 102 can determine 210 whether a signal quality of the uplink channel between the user device 116 and the satellite 114 does not meet a threshold based on the degradation indicator. In one example, the server 102 may determine that when the value for the signal quality of the uplink channel between the user device 116 and the satellite 114 meets or exceeds 20 dB, no further action is needed as the signal quality is sufficient. In another example, the server 102 may determine that when the value for the signal quality of the uplink channel between the user device 116 and the satellite 114 is below 20 dB, mitigation techniques should be implemented. When the signal quality of the uplink channel between the user device 116 and the satellite 114 does not meet a threshold based on the degradation indicator, the server 102 can further determine to implement actions that mitigate, prevent, and/or reduce uplink interference.

The server 102 generates and communicates 212 a query to a database 120 that is communicatively available or accessible via one or more of the telecommunications network 104 and/or satellite network 112. The server 102 may, for example, input a unique identifier specified in the degradation indicator and the current date and time (e.g., a date and time/a timestamp that is associated with the generation of and/or the server's receipt of the degradation indicator), which together, act as a query string for locating data that specifically corresponds to the satellite 114. In such an example, the unique identifier may be utilized as, or can itself act as, a query. This query can be used to particular identify the satellite 114, the satellite network 112 in which the satellite 114 is operating, configurations of the satellite 114 and/or the satellite network 112, or any combination thereof.

The database 120 stores a plurality of unique satellite identifiers, and each unique satellite identifier is linked to or stored in association with a detailed trajectory path for that particular satellite. A trajectory path includes a plurality of geographic surface areas or locations, which can correspond to coverage areas of that satellite, as well as the dates and times at which the satellite's overhead travel above the Earth corresponds to those particular geographic surface areas. In various aspects, the detailed trajectory path data includes projected paths with full sequences of future dates and times. As such, the database 120 stores a plurality of travel trajectories for various satellites, and the trajectories to be traveled by those satellites determines the plurality of coverage areas of each satellite at specific, corresponding dates and times. Based on a particular combination of date and time, the database 120 stores the geographic surface area for which the satellite 114 can provide communications coverage to user device(s) that is/are located within or at the edge of said geographic surface area on that date and at that time.

Additionally, the database 120 stores the geographic locations for a plurality of base stations, for example, as longitude and latitude coordinates. The geographic location may refer to the physical location of a cell tower associated with the base station and/or may correspond to all or a portion of a coverage area of the base station. The base stations may be stored in groups, each grouping being associated with each other based on the base stations' proximity to each other, proximity to one or more geographic surface areas in the trajectories of one or more satellites, locations within (or at the edge of) of more geographic surface areas in the trajectories of one or more satellites, and/or any combination thereof. For example, one grouping may include one or more base stations that are located within a specific geographic surface area that corresponds to a particular satellite's coverage area on a particular date and at a specific time. It will be understood that any base station may be part of more than one grouping, for any quantity of various satellites and their trajectories, based on the base station's location relative to the distinct trajectories of different satellites and those corresponding coverage areas.

As such, by querying the database using the unique identifier for the satellite and a current date and time, results are returned 216 from the database 120 to the server. Based on the returned results, the server 102 can identify one or more base stations to be used for implementing interference reduction techniques from within the group of base stations returned in the results. The one or more base stations are identified as having a physical location that is within or at the edge of the satellite's coverage area at the specific date and time included with the query, or having a location of a coverage area which completely or partially overlaps with the satellite's coverage area at the specific date and time included with the query. In other words, the base stations are identified as having one or more of their coverage areas that at least partially overlap with the current coverage area of the satellite, based on the current date and time. Thus, uplink communications between other user devices and these identified base stations are predicted, based on the server 102 and the query results, to be the cause of the noise occurring on the uplink channel between the user device 116 and the satellite 114 because these base stations are proximate to or within the satellite's coverage area, and because the uplink communications between other user devices and these base stations utilize all or some of the same (and/or adjacent) uplink frequencies as the user device 116 is utilizing to communicate with the satellite 114. The server 102 determines that implementing interference reduction techniques at the identified base stations is predicted to reduce noise and/or other interference that the base stations or user devices in communications therewith are causing on the uplink channel between the user device 116 and the satellite 114.

The server 102 can then generate 218 computer-readable instructions for the one or more base stations. In order to reduce uplink interference, the computer-readable instructions may specify and/or instruct each of the one or more base stations to automatically blank one or more physical resource blocks on the uplink channel between other user device(s) and the base station(s). The quantity of physical resource blocks to be blanked can be predetermined (e.g., fixed or static) or dynamically determined by the server 102. In some aspects, the server 102 may dynamically determine a particular quantity of physical resource blocks to blank, wherein the quantity of physical resource blocks specifically corresponds to the value for the signal quality. In such an aspect, the computer-readable instructions may specify the particular quantity of physical resource blocks to be blanked by the base station. The quantity may be dynamically determined and customized for each of a plurality of base stations to receive the instructions, in some aspects, depending on the traffic load at each specific base station, in some aspects. Or, the computer-readable instructions may specify a predetermined quantity of physical resource blocks to be blanked by the base station(s). In various aspects, the computer-readable instructions may specify a time duration for which the physical resource blocks are to be blanked by the base station, upon which the lapse of that time duration, the blanking technique can be discarded and scheduling of physical resource blocks should be resumed without blanking.

The server 102 communicates 220 the computer-readable instructions to the base station 106A directly or indirectly through the telecommunications network 104. The computer-readable instructions cause, as shown in the example of FIG. 2, the base station 106A to schedule instructions for and communicate 224 with the user device 110A, via the downlink, in a manner that follows and adheres to the computer-readable instructions for blanking physical resource blocks and/or for blanking a particular quantity of physical resource blocks. Then, the user device 110A will adhere to the scheduling designations provided, and the user device 110A will automatically blank the one or more physical resource blocks when communicating 226 on the uplink channel with the base station 106A.

By automatically blanking one or more physical resource blocks when the user device 110A communicates with the base station 106A using all or some portion of the same radio frequencies utilized by the user device 116 when communicating with the satellite 114, noise and/or other interference that is caused by the user device 110A and experienced on the uplink channel between the satellite 114 and the user device 116 is reduced or mitigated.

Having described the system 100 and components thereof, it will be understood by those of ordinary skill in the art that system 100 is but one example of a suitable system and is not intended to limit the scope of use or functionality of the present invention. Similarly, system 100 should not be interpreted as imputing any dependency and/or any requirements with regard to each component and combination(s) of components illustrated in FIG. 1. It will be appreciated by those of ordinary skill in the art that the location of components illustrated in FIG. 1 is an example, as other methods, hardware, software, components, and devices for establishing communication links between the components shown in FIG. 1, may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should be not be interpreted as limiting the present invention to exclude additional components and combination(s) of components. Moreover, though components are represented in FIG. 1 as singular components, it will be appreciated that some aspects may include a plurality of devices and/or components such that FIG. 1 should not be considered as limiting the number of any of the depicted devices or components.

Figure 3:
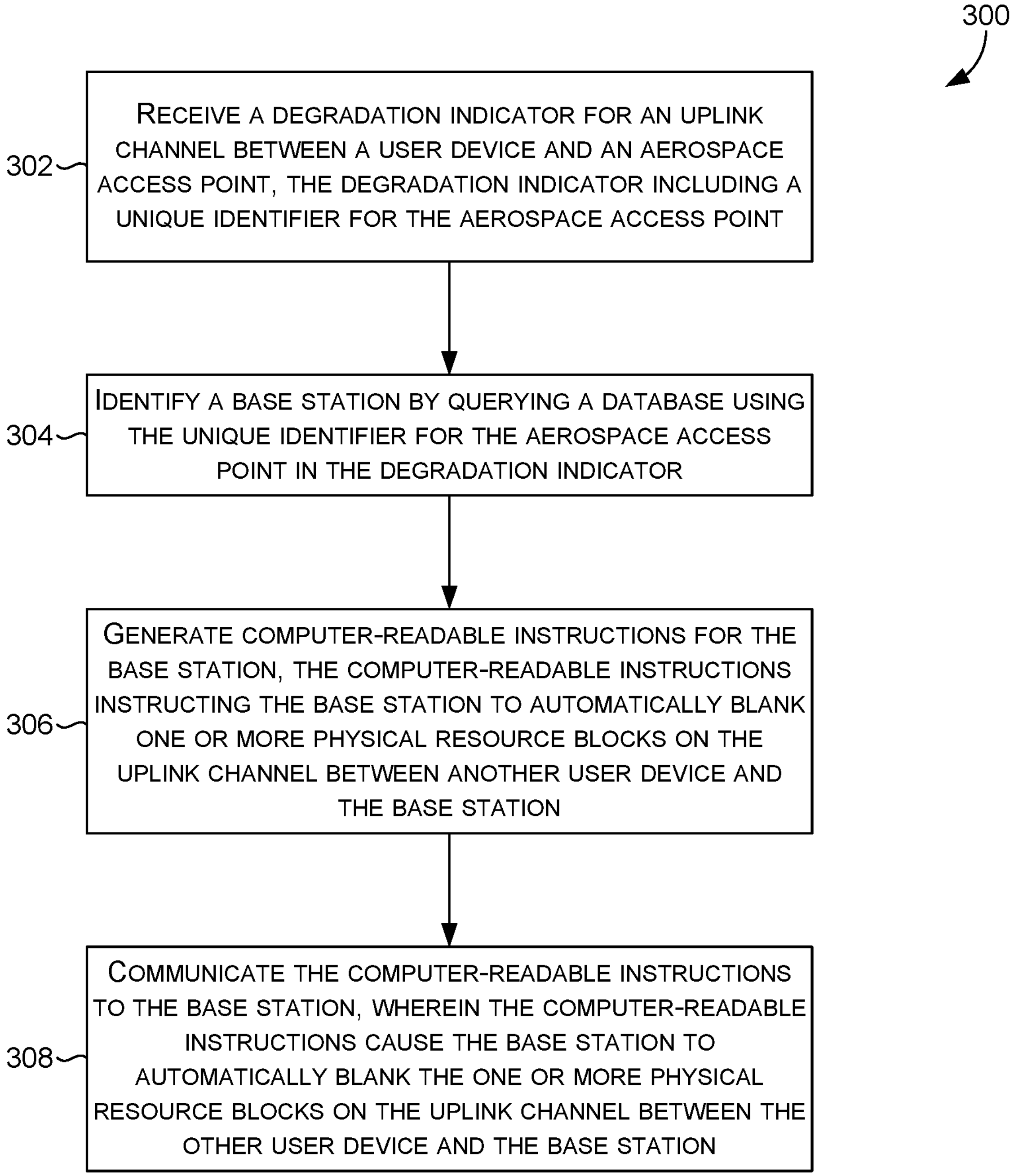
FIG. 3 depicts an example method, in accordance with one or more embodiments.

Turning to FIG. 3, a method 300 is provided for mitigating interference. In some aspects, the method 300 can be a computer-implemented method. In one aspect, one or more non-transitory computer-readable storage media having computer-readable instructions or computer-readable program code portions embodied thereon, for execution via one or more processors, can be used to implement and/or perform the method 300. For example, computer-readable instructions or computer-readable program code portions can specify the performance of the method 300, specify a sequence of steps of the method 300, and/or can identify particular component(s) of software and/or hardware for performing one or more of the steps of the method 300, in aspects. As discussed below, the method 300 can be performed using software, hardware, component(s), and/or device(s) depicted in the example of FIG. 1. For example, various steps of the method 300 may be performed by a terrestrial access point, server, and/or terrestrial backhaul component.

At block 302, a degradation indicator for an uplink channel between a user device and an aerospace access point is received, where the degradation indicator includes a unique identifier for the aerospace access point. At block 304, a base station is identified by querying a database using the unique identifier for the aerospace access point in the degradation indicator. The one or more base stations can be identified as having one or more coverage areas that at least partially overlap with a current coverage area of the aerospace access point, in aspects. At block 306, computer-readable instructions for the base station are generated, where the computer-readable instructions instruct the base station to automatically blank one or more physical resource blocks on the uplink channel between another user device and the base station. In aspects, the one or more physical resource blocks correspond to radio frequencies that at least partially overlap with and/or are adjacent to radio frequencies of the uplink channel between the user device and the aerospace access point. At block 308, the computer-readable instructions are communicated to the base station, where the computer-readable instructions cause the base station to automatically blank the one or more physical resource blocks on the uplink channel between the other user device and the base station.

In further aspects, an additional degradation indicator for the uplink channel between the user device and the aerospace access point is subsequently received, for example, after the computer-readable instructions have been communicated to the base station to automatically blank the one or more physical resource blocks. As such, the uplink channel can be periodically or continuously monitored such that any quantity of additional degradation indicators may be received to report on signal quality. Based on the additional degradation indicator, it can be determined that the uplink channel does not meet a threshold, in one aspect. The threshold may define a preferred value for signal quality, in some aspects, such that the failure to meet the threshold indicates that the uplink channel signal quality is poor due to noise and/or other interference. Based on this determination, additional computer-readable instructions are generated for instructing the at least one base station to automatically blank one or more additional physical resource blocks on the uplink channel between the other user device and the at least one base station, wherein the one or more additional physical resource blocks corresponding to the radio frequencies that at least partially overlap with and/or are adjacent to the radio frequencies of the uplink channel between the user device and the aerospace access point. The additional computer-readable instructions are then communicated to the at least one base station, wherein the additional computer-readable instructions cause the at least one base station to automatically blank the one or more additional physical resource blocks on the uplink channel between the other user device and the at least one base station.

In some aspects, when an additional degradation indicator for the uplink channel between the user device and the aerospace access point is subsequently received, it may be determined that noise on the uplink channel at least meets a threshold. The threshold may define a preferred value for signal quality, in some aspects, such that the ability to meet the threshold indicates that the uplink channel signal quality is good and is not or is minimally impacted by noise by and/or other interference. Based on this determination, additional computer-readable instructions can be generated for instructing the at least one base station to automatically blank fewer physical resource blocks on the uplink channel, or to blank none of the physical resource blocks on the uplink channel between the other user device and the at least one base station. Then, the additional computer-readable instructions are communicated to the at least one base station, where the additional computer-readable instructions cause the at least one base station to automatically blank fewer or none of the physical resource blocks on the uplink channel between the other user device and the at least one base station.

Figure 4:
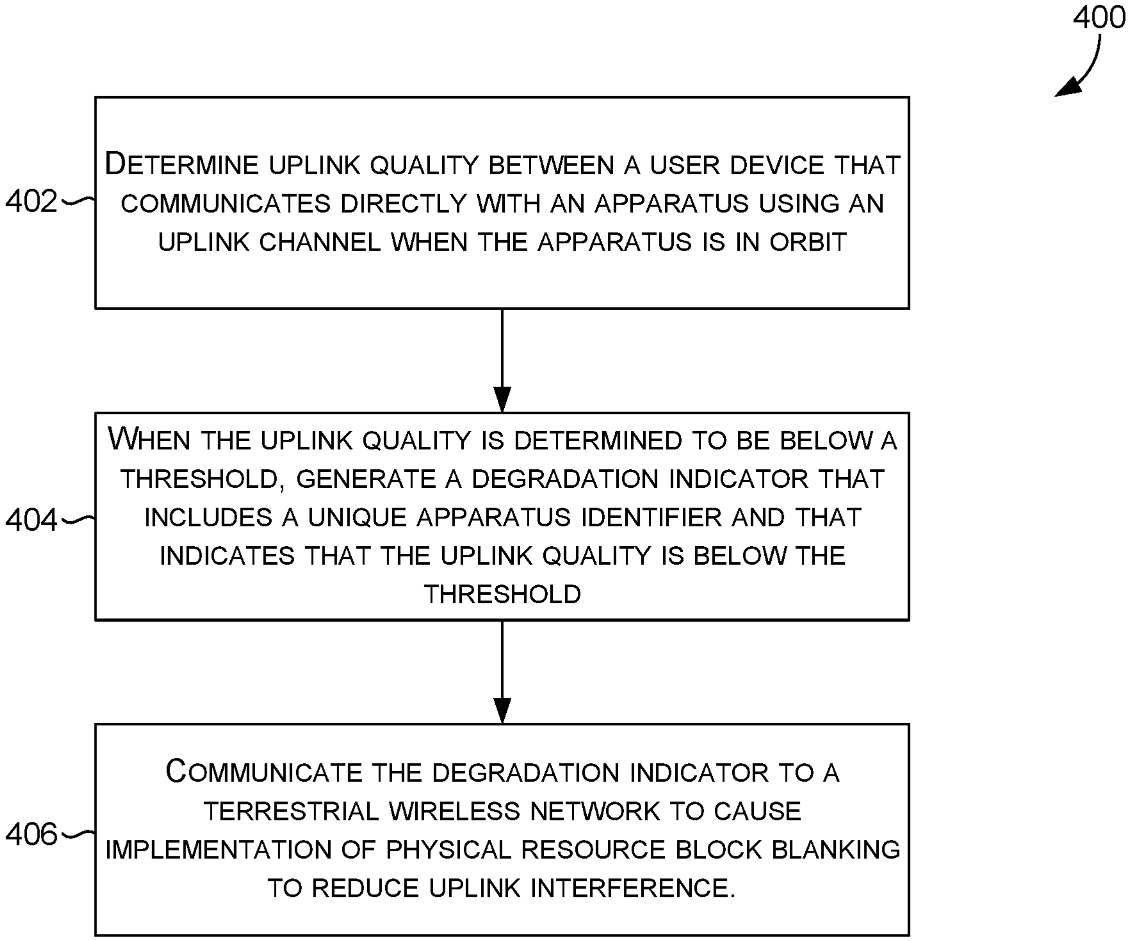
FIG. 4 depicts another example method, in accordance with one or more embodiments, in accordance with one or more embodiments.

Turning to FIG. 4, another method 400 is provided for mitigating interference. In some aspects, the method 400 can be a computer-implemented method. In one aspect, one or more non-transitory computer-readable storage media having computer-readable instructions or computer-readable program code portions embodied thereon, for execution via one or more processors, can be used to implement and/or perform the method 400. For example, computer-readable instructions or computer-readable program code portions can specify the performance of the method 400, can specify a sequence of steps of the method 400, and/or can identify particular component(s) of software and/or hardware for performing one or more of the steps of the method 400, in aspects. As discussed below, the method 400 can be performed using software, hardware, component(s), and/or device(s) depicted in the example of FIG. 1. For example, various steps of the method 400 may be performed by an aerospace access point and/or aerospace network component.

At block 402, the uplink quality between a user device that communicates directly with an apparatus when the apparatus is in orbit is determined based on one or more communications sent by the user device over an uplink channel. For example, when the one or more processors receive a communication from the user device over the uplink channel, the one or more processors may measure the uplink signal quality based on one or more of a Signal to Interference & Noise Ratio (SINR) measurement or a path loss measurement. When the uplink quality for the uplink channel is determined to be below a threshold, a degradation indicator is generated that includes a unique apparatus identifier and an indication that uplink quality is less than the threshold, shown at block 404. In various aspects, the threshold defines a determined value or a determined value range, and values that are less than the threshold are indicative of decreased signal quality, whereas values that meet or exceed the threshold are indicative of increased signal quality. At block 406, the degradation indicator of the uplink quality is communicated to a terrestrial wireless network.

In further aspects, the uplink quality of the uplink channel can be subsequently determined (or re-determined) based on an additional communication sent from the user device directly to the apparatus. For example, the uplink quality of the uplink channel may be determined to remain below the threshold based on the additional communication sent from the user device directly to the apparatus. In one such example, another degradation indicator is generated that includes the unique identifier of the apparatus and a timestamp, and that degradation indicator indicates the uplink quality of the uplink channel is below the threshold. This other degradation indicator is then communicated to the terrestrial network component to cause implementation of physical resource block blanking to reduce uplink interference.

In another example, the uplink quality may be determined to now meet or exceed the threshold based on the additional uplink channel communication from the user device. Then, a performance indicator may be generated that includes the unique identifier of the apparatus and a timestamp, where performance indicator indicates that the uplink quality meets or exceeds the threshold. The performance indicator may be communicated to a terrestrial network component.

Figure 5:
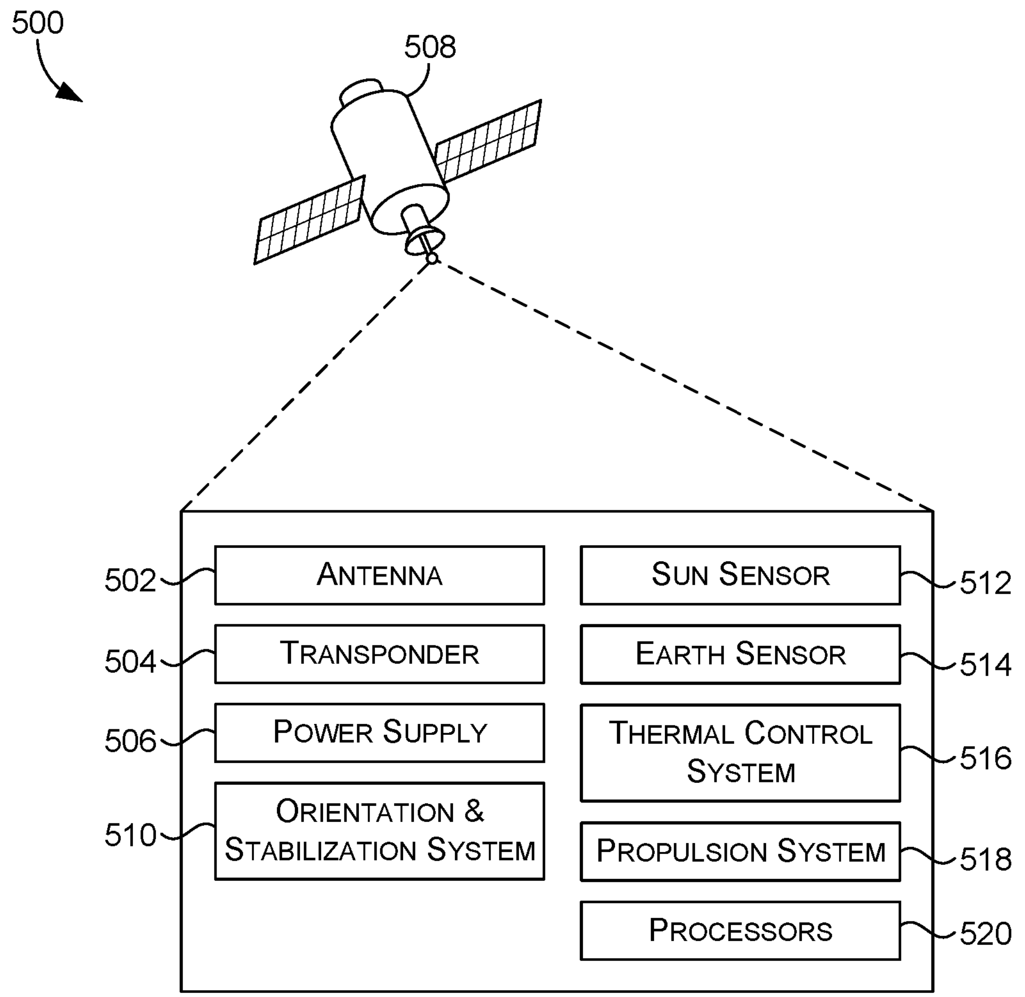
FIG. 5 depicts an example aerospace device, in accordance with one or more embodiments.

FIG. 5 provides a diagram of an example aerospace access point 100 and/or system for use in implementations of the present disclosure. The aerospace access point 100, such as a satellite, may include an antenna 502, a transponder 504, a power supply 506, and a housing 508, in aspects. The aerospace access point 100 can further include one or more of an orientation and stabilization system 510, a sun sensor 512, an Earth sensor 514, a thermal control system 516, a propulsion system 518, one or more processors 520, or any combination thereof.

The antenna 502, as previously described herein, may comprise one or more antennas. For example, the aerospace access point 100 can include a command antenna and a communication antenna. As such, the aerospace access point 100 can utilize a command antenna when communicating for telemetry and tracking, while using the communication antenna to receive uplink and/or downlink communications from terrestrial devices, such as a user device, satellite dish, and/or base station.

The transponder 504 comprises hardware that operates as a transmitter-receiver system for processing and modifying radio frequencies based on receiving signals and/or transmitting signals using one or more antennas. In various aspects, the aerospace access point 100 may include a plurality of transponders. Transponders can include subcomponents, for example, such as a duplexer, noise amplifiers (e.g., low noise amplifier), processors (e.g., carrier processors), power amplifiers, filters, frequency converters, oscillators, modulators, and/or any combination or quantity thereof.

The power supply 506 operates to provide power to the aerospace access point 500 and the aerospace access point components. The power supply 506 can include one or more components for capturing, storing, releasing, and/or controlling the flow of power to provide power for the operations of the aerospace access point components. Examples of a power supply include a battery or a solar panel or array.

The housing 508 is a physical structure that encloses or physically protects components of the aerospace access point 500. A solar array and/or antennas may be positioned outside or may be attached to a housing, whereas processors and thermal control systems may be housed within the housing 508.

The orientation and stabilization system 510 is configured to stabilize the aerospace access point 500, such as spin stabilization and/or three-axis (e.g., yaw axis, roll axis, and pitch axis) stabilization. The orientation and stabilization system 510 can include or utilize the sun sensor 512 and/or the Earth sensor 512 in various aspects. The orientation and stabilization system 510 can also communicate with and provide instructions to the propulsion system 518 in order to modify the positon and orientation of the aerospace access point 500, or specific components, such as a solar array or antenna(s). For example, the orientation and stabilization system 510 can, via sensors, detect spin or rotation and utilize the propulsion system 518 (e.g., thrusters) to modify or control the speed of rotation (e.g., the speed by which the aerospace access point 500 is spinning around its own central, vertical axis) in order to stabilize the aerospace access point 500. The orientation and stabilization system 510 can include one or more momentum wheels or reaction wheels, driven by motors, and which are mounted on three perpendicular axes (e.g., yaw axis, roll axis, and pitch axis).

The sun sensor 512 is a navigational sensor configured to detect the direction and position of the sun, and to determine the orientation of the aerospace access point with respect to the sun. The sun sensor 512 can further be configured to provide positional information and data that can be used to align a power supply system component, such as a solar array, to capture light. The Earth sensor 514 is a navigational sensor configured to detect the direction and position of the Earth (e.g., detection of light at or near the Earth's horizon when in orbit), and to determine orientation of the aerospace access point 500 with respect to the Earth. The Earth sensor 514 can provide positional information and data that can be used to determine orientation to the Earth's edge, for example, which may be used to determine roll angle and pitch.

The thermal control system 516 regulates and/or maintains optimized temperatures that ensure proper functioning of the aerospace access point 500 and the aerospace access point components. Examples of thermal control systems include thermoelectric coolers, heaters, fluid loop systems, and the like.

The propulsion system 518 operates to modify the position, orientation, pitch, and/or angle of the aerospace access point 500 and any components located on the exterior of the housing 508 of the aerospace access point 500, when the aerospace access point 500 is in orbit. The propulsion system 518 can be an "in-space" propulsion system that can rely on and utilize chemical propulsion, electric propulsion, and/or propellant-less propulsion. The propulsion system 518 can include, for example, thrusters, jets, solar sails, electrodynamic tethers, aerodynamic drag devices, monopropellant systems, bipropellant systems, hybrid propellants, cold/warm gas propellants, liquid propellants, solid propellants, electrothermal propulsion, electrospray propulsion, gridded ion propulsion, Hall-effect propulsion, pulsed plasma propulsion, vacuum arc propulsion, ambipolar propulsion, and any combination thereof. The propulsion system 518 may be controlled by processors and/or can work in tandem with or as a subsystem of the orientation and stabilization system 510, in various aspects.

The one or more processors of the aerospace access point 500 can be utilized by and can support any or all of the components and subsystems discussed above, and can perform any and all aspects described with regard to the method 400 of FIG. 4. As such, the one or more processors are specially configured to determine the uplink quality between a user device that communicates directly with the aerospace access point 500 using an uplink channel, when the aerospace access point 500 is in orbit. The processor(s) may further generate a degradation indicator that includes a unique identifier of the aerospace access point 500 and that indicates that the uplink quality of the uplink channel is below a threshold, in response to determining that the uplink quality is below the threshold. The aerospace access point 500 may communicate the degradation indicator to a terrestrial wireless network for receipt and processing by a terrestrial component.

Figure 6:
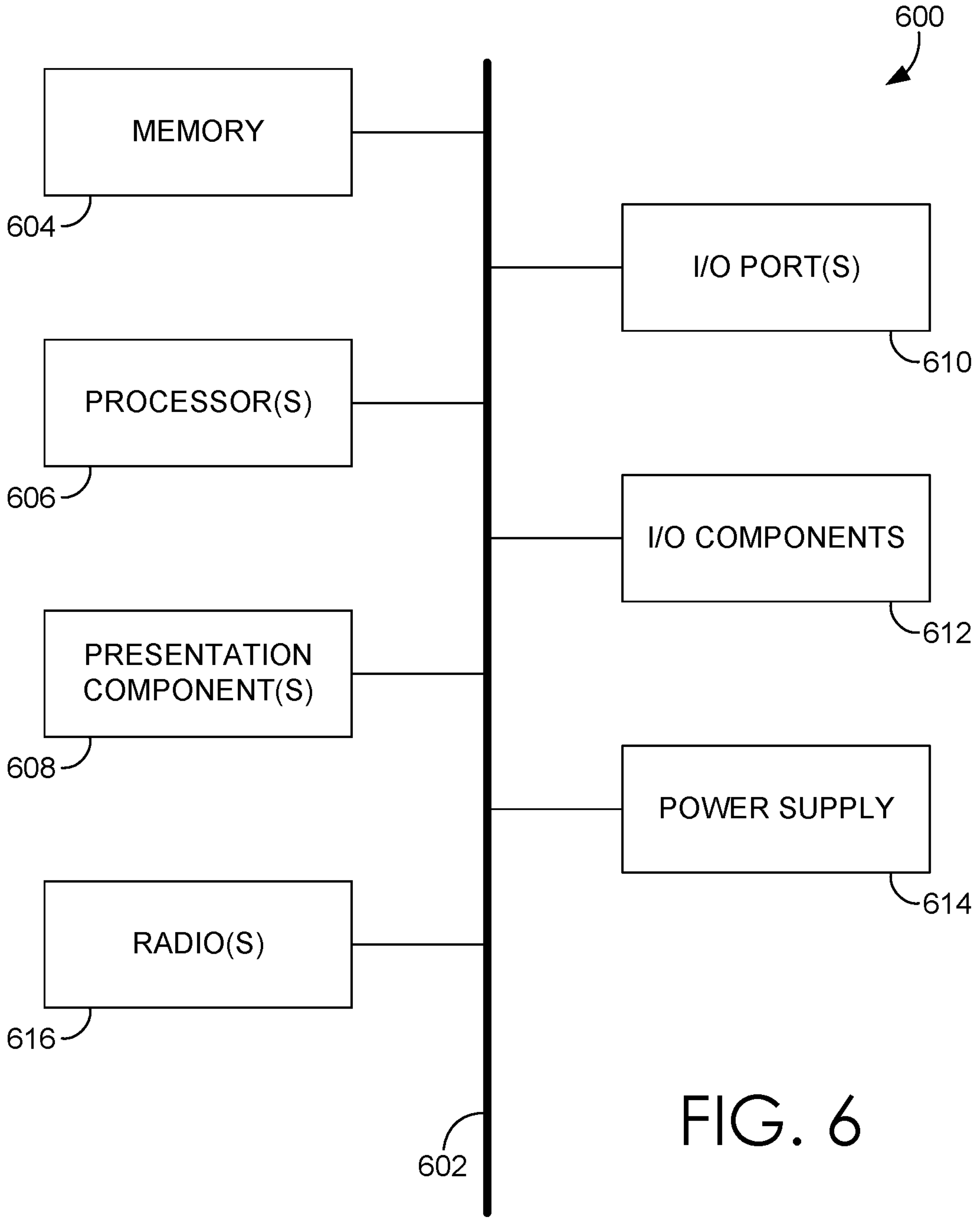
FIG. 6 illustrates an example computing device suitable for use in implementations of the present disclosure.

Turning now to FIG. 6, a diagram is depicted of another example computing device suitable for use in implementations of the present disclosure. Computing device 600 is but one example of a suitable computing environment and is not intended to suggest any limitation as to the scope of use or functionality of the invention, and nor should computing device 600 be interpreted as having any dependency or requirement relating to any one or combination of components illustrated.

The implementations of the present disclosure may be described in the general context of computer code or machine-useable instructions, including computer-executable instructions such as program components being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 6, computing device 600 includes bus 602 that directly or indirectly couples with the following devices: memory 604, one or more processors 606, one or more presentation components 608, input/output (I/O) ports 610, I/O components 612, and power supply 614. Bus 602 represents what may be one or more buses (such as an address bus, data bus, or combination thereof). Although the devices of FIG. 6 are shown with lines for the sake of clarity, in reality, delineating various components is not so clear, and metaphorically, the lines would more accurately be grey and fuzzy. For example, one may consider a presentation component such as a display device to be one of I/O components 612. Also, processors, such as one or more processors 606, have memory. Distinction is not made between such categories as "workstation," "server," "laptop," "handheld device," etc., as all are contemplated within the scope of FIG. 8 and refer to "computer" or "computing device."

Computing device 600 typically includes a variety of computer-readable media. Computer-readable media can be any available media that can be accessed by computing device 400 and includes both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information, such as computer-readable instructions, data structures, program modules or other data.

Computer storage media includes RAM, ROM, EEPROM, flash memory or other memory technology, CD-ROM, digital versatile disks (DVDs) or other optical disk storage, magnetic cassettes, magnetic tape, and magnetic disk storage or other magnetic storage devices. Computer storage media does not comprise a propagated data signal.

Communication media typically embodies computer-readable instructions, data structures, program modules or other data in a modulated data signal (such as a carrier wave or other transport mechanism), and includes any information delivery media. The term "modulated data signal" indicates a signal that has one or more of its characteristics set or changed in such a manner so as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 604 includes computer storage media in the form of volatile and/or non-volatile memory. Memory 604 may be removable, non-removable, or a combination thereof. Examples of memory include solid-state memory, hard drives, optical disc drives, etc. Computing device 600 includes one or more processors 606, which read data from various entities such as bus 602, memory 604, or I/O components 612. One or more presentation components 608 present data indications to a person or other device. Examples of one or more presentation components 608 include a display device, speaker, printing component, vibrating component, etc. I/O ports 610 allow computing device 600 to be logically coupled to other devices including I/O components 612, some of which may be built in computing device 600. Illustrative I/O components 612 include a microphone, joystick, game pad, satellite dish, scanner, printer, wireless device, etc.

Radio 616 represents a radio that facilitates communication with a wireless telecommunications network. Illustrative wireless telecommunications technologies include CDMA, GPRS, TDMA, GSM, and the like. Radio 416 might additionally or alternatively facilitate other types of wireless communications including Wi-Fi, WiMAX, LTE, or other VoIP communications. As can be appreciated, in various aspects the radio 616 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some aspects.

Many different arrangements of the various components depicted, as well as components not shown, are possible without departing from the scope of the claims below. Aspects of our technology have been described with the intent of being illustrative rather than restrictive. Alternative aspects will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. An apparatus comprising:

an antenna;

a transponder;

a power supply;

a housing; and one or more processors configured to:

determine uplink quality between a user device that communicates directly with the apparatus using an uplink channel when the apparatus is in orbit;

when the uplink quality is determined to be below a threshold, generate a degradation indicator that includes a unique apparatus identifier and that indicates that the uplink quality of the uplink channel is below a threshold;

communicate the degradation indicator to a terrestrial wireless network;

instruct the terrestrial wireless network to identify one or more terrestrial base stations having coverage areas that at least partially overlap a current coverage area of the apparatus by querying a database using the unique apparatus identifier and a timestamp associated with the degradation indicator; and instruct the terrestrial wireless network to automatically instruct the identified one or more terrestrial base stations to blank one or more physical resource blocks on uplink channels used by other user devices and reduce uplink interference with the apparatus, without modifying the uplink channel between the user device and the apparatus.

2. The apparatus of claim 1, wherein the one or more processors receive a communication from the user device over the uplink channel.

3. The apparatus of claim 1, wherein the one or more processors measure the uplink signal quality based on one or more of a Signal to Interference & Noise Ratio (SINR) measurement or a path loss measurement.

4. The apparatus of claim 1, wherein the one or more processors subsequently determine the uplink quality of the uplink channel based on an additional communication sent from the user device directly to the apparatus.

5. The apparatus of claim 4, wherein the one or more processors further:

determine that the uplink quality of the uplink channel remains below the threshold based on the additional communication sent from the user device directly to the apparatus;

generate another degradation indicator that includes the unique identifier of the apparatus and a timestamp, and that indicates the uplink quality of the uplink channel is below the threshold; and communicate the other degradation indicator to a terrestrial network component to implement physical resource block blanking to reduce uplink interference.

6. The apparatus of claim 4, wherein the one or more processors further:

determine that the uplink quality meets or exceeds the threshold based on the other uplink channel communication from the user device;

generate a performance indicator that includes the unique identifier of the apparatus and a timestamp, the performance indicator indicating that the uplink quality meets or exceeds the threshold; and communicate the performance indicator to a terrestrial network component.

7. The apparatus of claim 1, wherein the threshold defines a determined value or a determined value range, and wherein a value that is below the threshold is indicative of decreased signal quality, and wherein a value that meets or exceeds the threshold is indicative of increased signal quality.

8. One or more non-transitory computer-readable media storing instructions that when executed via one or more processors perform a computerized method, the computerized method comprising:

via one or more processors:

determining uplink quality between a user device that communicates directly with an apparatus when the apparatus is in orbit, based on one or more communications sent by the user device over an uplink channel;

when the uplink quality for the uplink channel is determined to be below a threshold, generating a degradation indicator that includes a unique apparatus identifier and an indication that uplink quality is less than the threshold;

communicating the degradation indicator of the uplink quality to a terrestrial wireless network; and instructing the terrestrial wireless network to identify one or more terrestrial base stations having coverage areas that at least partially overlap a current coverage area of the system by querying a database using the unique apparatus identifier and a timestamp associated with the degradation indicator; and instructing the terrestrial wireless network to automatically instruct the identified terrestrial base stations to blank one or more physical resource blocks on uplink channels used by other user devices and reduce uplink interference with the apparatus, without modifying the uplink channel between the user device and the system.

9. The media of claim 8, wherein the computerized method further comprising, receiving via the one or more processors, a communication from the user device over the uplink channel.

10. The media of claim 8, wherein the computerized method further comprising, measuring via the one or more processors, the uplink signal quality based on one or more of a Signal to Interference & Noise Ratio (SINR) measurement or a path loss measurement.

11. The media of claim 8, wherein the computerized method further comprising, subsequently determining via the one or more processors, the uplink quality of the uplink channel based on an additional communication sent from the user device directly to the apparatus.

12. The media of claim 8, wherein the computerized method further comprising, via the one or more processors:

determining that the uplink quality of the uplink channel remains below the threshold based on the additional communication sent from the user device directly to the apparatus;

generating another degradation indicator that includes the unique identifier of the apparatus and a timestamp, and that indicates the uplink quality of the uplink channel is below the threshold; and communicating the other degradation indicator to a terrestrial network component to implement physical resource block blanking to reduce uplink interference.

13. The media of claim 8, wherein the computerized method further comprising, via the one or more processors:

determining that the uplink quality meets or exceeds the threshold based on the other uplink channel communication from the user device;

generating a performance indicator that includes the unique identifier of the apparatus and a timestamp, the performance indicator indicating that the uplink quality meets or exceeds the threshold; and communicating the performance indicator to a terrestrial network component.

14. The media of claim 8, wherein the computerized method further comprising, wherein the threshold defines a determined value or a determined value range, and wherein a value that is below the threshold is indicative of decreased signal quality, and wherein a value that meets or exceeds the threshold is indicative of increased signal quality.

15. A system comprising:

an antenna;

a transponder;

a power supply system;

an orientation and stabilization system;

a housing; and one or more processors that:

determine uplink quality between a user device and the apparatus;

when the uplink quality is determined to be below threshold, generate a degradation indicator that include a unique apparatus identifier and indication that uplink quality is less than a threshold;

communicate the degradation indicator for an uplink channel to a terrestrial wireless network, via the air interface with satellite core;

subsequently determine the uplink quality between the user device and the apparatus;

instruct the terrestrial wireless network to identify one or more terrestrial base stations having coverage areas that at least partially overlap a current coverage area of the apparatus by querying a database using the unique apparatus identifier and a timestamp associated with the degradation indicator; and instruct the terrestrial wireless network to automatically instruct the identified terrestrial base stations to blank one or more physical resource blocks on uplink channels used by other user devices and reduce uplink interference with the apparatus, without modifying the uplink channel between the user device and the apparatus.

16. The system of claim 15, wherein the antenna comprises an uplink antenna and a downlink antenna.

17. The system of claim 15, wherein the antenna comprises a command antenna and a communication antenna.

18. The system of claim 15, further comprising one or more of a sun sensor or an earth sensor.

19. The system of claim 15, further comprising a thermal control system.

20. The system of claim 15, further comprising a propulsion system.

* * * * *